United States Patent Office 3,383,430
Patented May 14, 1968

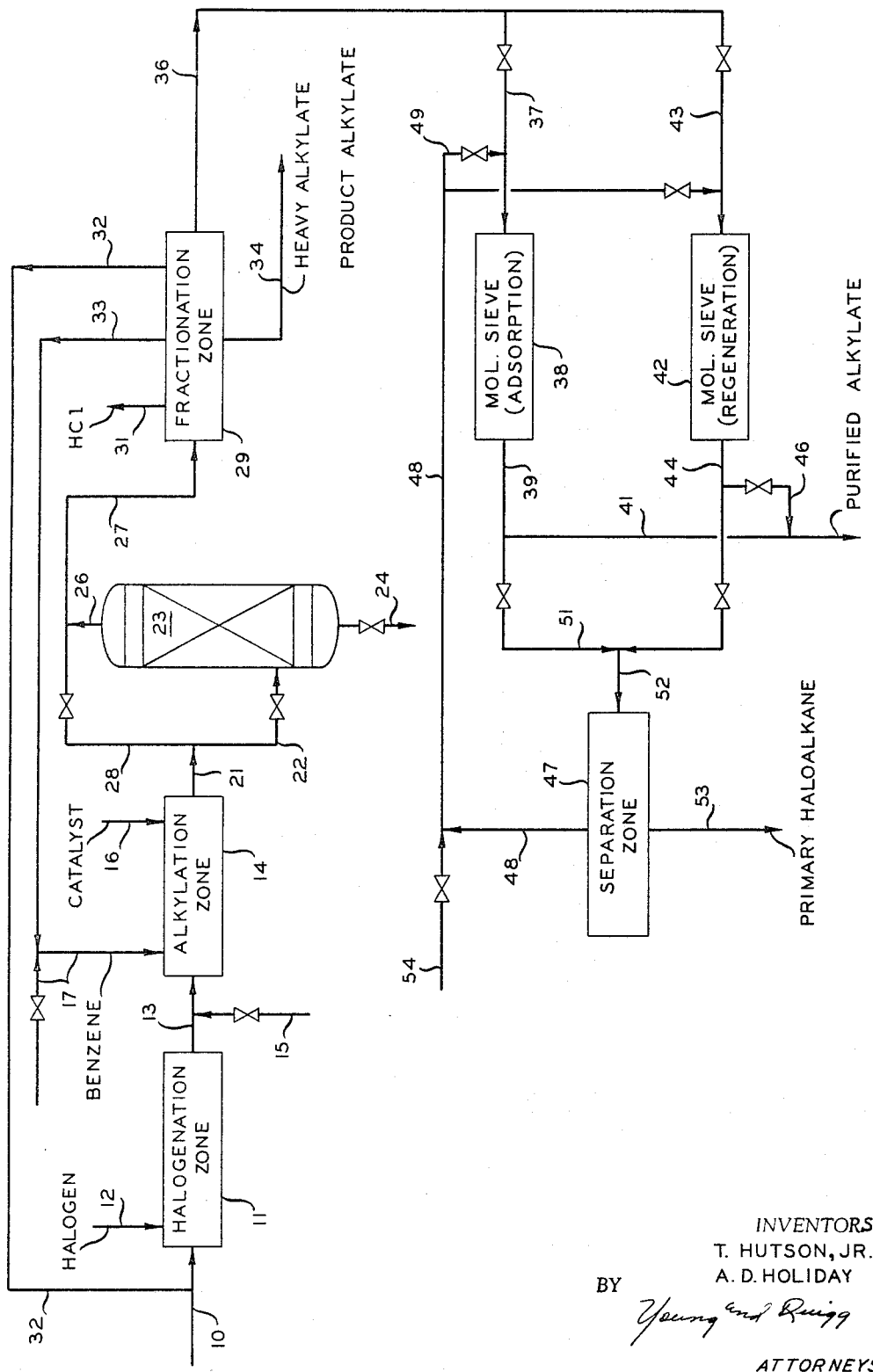

3,383,430
PURIFICATION OF ALKYLATES AND PRODUCTION OF PRIMARY HALOALKANES
Thomas Hutson, Jr., and Allan D. Holiday, Bartlesville, Okla., assignors to Phillips Petroleum Company, a corporation of Delaware
Filed July 20, 1964, Ser. No. 383,730
5 Claims. (Cl. 260—674)

ABSTRACT OF THE DISCLOSURE

Primary haloalkanes which are present in alkylate products as an impurity are removed therefrom by contacting the alkylate with a molecular sieve to selectively adsorb said haloalkanes. The alkylate recovered from the contacting zone is of increased purity and eminently suited for the manufacture of high grade detergents. The primary haloalkanes can be desorbed from the molecular sieve and recovered as a second high purity product of the process.

---

This invention relates to the purification of alkylates. In one aspect this invention relates to the removal of primary haloalkanes from detergent grade alkylates. In another aspect this invention relates to the production of primary haloalkanes.

Various processes have been proposed in the prior art for the production of detergent grade alkylates and sulfonates thereof to produce detergents. Most of these processes are subject to one disadvantage or another. For example, some of the commonly employed processes are uneconomical due to the particular reactants employed and/or reaction steps required. Some of said processes are impractical because the products recovered are not in a pure or practically pure state, thus lowering quality and value of the resulting products. It is highly desirable that the detergent prepared from the detergent grade alkylate be biodegradable. Otherwise, the widespread use of such detergents creates pollution problems because said detergents are not consumed by the bacteria or otherwise disposed of in sewage disposal plants.

One method for the production of a large class of detergents comprises the alkylation of certain aromatic hydrocarbons with haloalkanes to produce an alkylate comprised principally of monoalkyl aromatics which are subsequently sulfonated. A wide variety of processes are available for the production of said haloalkanes which are utilized as alkylating agents in said alkylation. Many of these processes involve the halogenation of paraffinic hydrocarbons in the presence or absence of ultraviolet light. Such processes yield mixtures of mono- and polyhalo compounds, with the monohalo compounds being a mixture of primary, secondary, and tertiary halides. The halogenation process can be controlled to minimize the formation of polyhalo compounds. If the paraffins employed as the starting materials are all normal paraffins, no tertiary halides will be present in the yield mixture. Because of the greater number of secondary carbon atoms present in the paraffinic hydrocarbons, the amount of secondary monohalides present in the yield mixture will be much greater than the amount of primary monohalides.

The above-mentioned alkylation step is commonly carried out in the presence of an aluminum chloride-hydrocarbon complex catalyst and a hydrogen chloride promoter therefor. In such alkylation processes the reaction rate of the secondary and tertiary haloalkanes with the aromatic compound is much greater than the reaction rate of the primary haloalkanes. Consequently, there usually is some primary haloalkane, ranging from trace amounts to small but significant amounts, which remains unreacted. In commercial operations employing commercial fractionation and other separation techniques, some of this unreacted primary haloalkane usually ends up in the product alkylate as an impurity. This is undesirable because said impurity is usually carried on through the system and ends up in the detergent end product.

Haloalkanes, and particularly primary haloalkanes, are valuable starting materials for a number of other valuable materials such as alcohols, amines, and the like. Primary haloalkanes in high purity can be utilized to produce primary alcohols, primary amines, and the like of high purity and in high yield. Thus, a source of high primary haloalkanes would be valuable.

The present invention provides a solution for the above-described difficulties and problems. We have discovered that primary haloalkanes which are present in alkylate products as an impurity can be removed from said alkylate by contacting same with a crystalline zeolite molecular sieve and selectively adsorbing said haloalkanes by said molecular sieve. The alkylate recovered from the contacting zone has a substantially reduced content of haloalkanes, is thus of increased purity, and is eminently suitable for the manufacture of high grade detergents. Furthermore, the adsorbed haloalkanes can be desorbed from the molecular sieve and recovered as high purity primary alkane product which is eminently suitable for the manufacture of high purity primary alcohols, etc. as described above.

An object of this invention is to provide a process for the purification of alkylates. Another object of this invention is to provide a process for the purification of detergent grade alkylates to produce an alkylate which is eminently suitable for the production of high grade detergents. Another object of this invention is to provide a process for removing primary haloalkanes from alkylates. Another object of this invention is to provide a process for the production of high purity primary haloalkanes. Another object of this invention is to provide a process for removing haloalkanes from hydrocarbon mixtures containing the same. Other aspects, objects, and advantages of the invention will be apparent to those skilled in the art in view of this disclosure.

Thus, according to the invention, there is provided a process for the removal of primary haloalkanes from a hydrocarbon fraction, which process comprises: contacting said hydrocarbon fraction with a crystalline zeolite molecular sieve material, and recovering a treated hydrocarbon fraction having a substantially reduced haloalkane content.

The invention is particularly applicabe for the removal of primary haloalkanes containing from 10 to 15 carbon atoms per molecule from mixtures thereof with paraffin hydrocarbons containing the same number of carbon atoms, and which can also contain alkyl substituted aromatic compounds wherein the alkyl substituent contains from 10 to 15 carbon atoms.

Further according to the inventon, the primary haloalkanes adsorbed by the molecular sieve can be desorbed therefrom and recovered as high purity primary haloalkane product.

The adsorption or molecular sieve materials applicable in the present invention are the various naturally occuring zeolite or synthetic zeolites. Applicable materials are the various crystalline alumino-silicates which have been heated to remove water of hydration. The adsorbent materials may be prepared by any of the well known methods in the art. Of the three classes of crystalline zeolites, fibrous, laminar, and rigid three-dimensional anionic networks, the last mentioned class only is suitable in our invention. Examples of such materials include chabazite, phacolite, gmelinite, harmotone, and the like, or suitable modifications thereof, produced by base exchange. The literature contains many references to the composition and adsorbing action of molecular sieve.

Generally speaking, molecular sieves are alkali metal or alkaline earth metal alumino-silicates and can be either natural or synthetic in origin. Said materials have large numbers of submicroscopic cavities interconnected by many smaller pores or channels which are extremely uniform in size. In operation, the generally accepted explanation for the action of the molecular sieves is that adsorption takes place within said pores, and only those materials having molecular diameters small enough to enter said pores are retained by the zeolite. Hence, the name molecular sieves. Molecular sieve materials applicable in the practice of the invention include those having pore diameters within the range of from 5 to 20 angstroms. A presently preferred molecular sieve material, and the one employed in the example given hereinafter, is known in the art as Linde Type 5A. The molecular sieve materials can be employed in granular form, such as 1/16 to 1/4-inch pellets, or in finely divided form, such as up to about 200 mesh. Contacting of the hydrocarbon fractions with the molecular sieve materials can be carried out in any suitable zone, such as a fixed bed, moving bed, or the like.

The process conditions employed for contacting the haloalkane-containing hydrocarbon fractions with the molecular sieve materials in accordance with the invention can vary considerably depending upon the concentration of haloalkane material in the hydrocarbon fraction to be treated, the desired degree of removal of said haloalkane, and other variables. The contacting temperature employed can be within the range of from about 70 to about 200° F., preferably about 70 to about 150° F., and more preferably about 80 to 100° F. The contacting pressure is not critical and can be within the range of from atmospheric to about 600 p.s.i.g. Generally speaking, the contacting pressure employed is sufficient to maintain the hydrocarbon being contacted in liquid phase and sufficient to provide for normal pressure drops through the bed when a fixed bed is employed. Said contacting can be carried out at liquid space velocities within the range of from 0.5 to 5.0, preferably 0.8 to 1.2 volumes of hydrocarbon per volume of molecular sieve per hour.

The molecular sieve adsorbent materials employed in the practice of the invention can be regenerated in any suitable manner such as by heating, and/or contacting with a suitable gas, for example, hydrogen. The hydrogen employed in many instances can conveniently be obtained from a catalytic reforming unit. Regeneration temperatures within the range of from about 200 to about 600° F., preferably 300 to 450° F., can be utilized. Said regeneration can be carried out at any suitable pressure. However, when a gas such as hydrogen from a catalytic reforming unit is employed as the regeneration medium it is generally preferred to carry out the regeneration at approximately the same system pressure employed in the catalytic reforming operation, for example, within the range of from about 400 to about 1000 p.s.i.g. It is also within the scope of the invention to employ suitable liquid regeneration medium. Another method which can be employed to remove the adsorbed primary haloalkanes from the molecular sieve adsorbent is evacuation. Still another method is to pass air or other oxygen-containing gas preheated to a temperature within the range of about 500 to 800° F. and burning off the adsorbed haloalkanes under controlled conditions. Obviously, this latter method is not employed when it is desired to recover the haloalkanes.

It is a feature of the present invention that the haloalkanes desorbed from the molecular sieve materials can be recovered as a valuable by-product of the process. The desorbed primary haloalkanes are valuable starting materials for other chemicals as set forth above. Since the activity level of the catalysts necessary to obtain essentially complete alkylation of primary haloalkanes is much higher than that necessary to obtain essentially complete alkylation of the secondary haloalkanes, and is much more difficult to maintain, it is usually advantageous to operate the alkylation zone employing a catalyst of "normal" activity (about 140 to 160 calories per gram heat of hydrolysis), and then remove the residual primary haloalkanes in accordance with this invention. Thus, depending upon the specification requirements for the alkylate product, or other hydrocarbon fraction containing the haloalkanes, the activity of the catalyst can be balanced against the amount of primary haloalkanes which can be removed in accordance with the invention. It is thus within the scope of the invention to operate the alkylation zone employing a catalyst having less than normal activity, for example, less than 140 calories per gram heat of hydrolysis, e.g., 100 to 139 calories per gram, and thus increase the amount of primary haloalkanes in the alkylate product and which can be removed therefrom, and recovered in accordance with the invention.

It is well known that aluminum chloride forms a complex or complexes with hydrocarbons and said complex or complexes have catalytic properties. The chemistry of aluminum chloride catalysis of hydrocarbon conversions is not completely understood. It is presently believed by those skilled in the art that aluminum chloride per se and aluminum chloride-hydrocarbon complexes both exert catalytic activities in said conversions. Thus, herein and in the claims, unless otherwise specified, the term "aluminum chloride catalyst" is employed generically to include both aluminum chloride and aluminum chloride-hydrocarbon complexes.

Referring now to the drawing, the invention will be more fully explained. Said drawing is a schematic flow sheet of one type of hydrocarbon conversion process having incorporated therein one embodiment of the present invention. The process illustrated comprises the alkylating of an aromatic hydrocarbon with an alkyl halide to produce a detergent grade alkylate. It will be understood that said drawing is diagrammatic in nature and many valves, pumps, condensers, heaters, surge tanks, control instruments, etc., not necessary for explanation of the invention to those skilled in the art, have been omitted. In the process illustrated in said drawing, a suitable hydrocarbon mixture comprising predominantly normal paraffinic and isoparaffinic hydrocarbons of suitable boiling range, such as a $C_{10}$ to $C_{15}$ or a $C_{13}$ to $C_{15}$ fraction, is introduced via conduit 10 into photochemical halogenation zone 11 wherein it is contacted in the presence of light with a halogenating agent introduced via conduit 12. Usually the hydrocarbon fraction introduced into halogenation zone 11 will preferably contain a high percentage of normal paraffinic hydrocarbons. Such a fraction can be obtained by contacting kerosene with a suitable molecular sieve. However, it is within the scope of the invention to utilize mixtures of hydrocarbons which comprise predominantly branched chain paraffin hydrocarbons. If desired, the hydrocarbon introduced via conduit 10 can be a pure or essentially pure paraffinic hydrocarbon.

Chlorine is the presently most preferred halogenating agent. Any suitable halogenation conditions can be employed in said halogenation zone but it is preferred to select conditions which provide about 20 percent conversion of the hydrocarbons to halogenated hydrocarbons per pass. Said conditions will include a temperature within the range of from 0 to 100° F., preferably 20 to 50° F., a pressure within the range of from 20 to 100 p.s.i., preferably 30 to 50 p.s.i., and a reaction time within the range of 8 to 20 seconds. It will be understood that said conditions are interrelated and variation in one condition will be accompanied by variation in one or more of the other conditions. For example, when using the preferred halogenating agent (chlorine), pressure is employed to maintain the hydrocarbon in liquid phase (if necessary) and also to increase the solubility of gaseous chlorine in said hydrocarbons. The amount of pressure actually employed will depend upon the hydrocarbons present, the temperature, and the desired conversion level. With respect to temperature, higher temperatures favor the formation of dichlorides which is undesirable. Higher conversion rates also favor the formation of dichlorides. It is preferred to select conditions such that the ratio of monochlorides to dichlorides is within the range of from 4:1 to 30:1, preferably 7:1 to 12:1, more preferably about 9:1. The chlorination reaction is a photochemical reaction and is carried out by dissolving the chlorine in the hydrocarbon and then exposing the resulting mixture or solution to ultraviolet light under time, temperature, and pressure conditions within the ranges set forth above.

It is to be understood that the invention is not limited to employing photochemical halogenation in the halogenation step. Haloalkanes prepared by any other suitable halogenation method such as thermal and catalytic methods can be employed in the practice of the invention. Halogenating agents in addition to those mentioned above which can be employed include sulfuryl chloride, thionyl chloride, and others. Halogenation catalysts which can be employed include ferric chloride, antimony chloride, sulfur chloride, iodoform, benzoyl peroxide and others. It should also be understood that it is within the scope of the invention to introduce pure or substantially pure halohydrocarbons from any source into the system via conduit 15, instead of or in addition to the halohydrocarbons from conduit 13.

A mixture of halogenated and nonhalogenated hydrocarbons is withdrawn from halogenation zone 11 via conduit 13 and introduced into alkylation zone 14. A suitable alkylation catalyst, such as aluminum chloride and/or aluminum chloride-hydrocarbon complex is introduced into alkylation zone 14 via conduit 16. A suitable alkylatable hydrocarbon is introduced into zone 14 via conduit 17. The process is applicable to the alkylation of benzene, toluene, xylene, and the like and is particularly applicable to the alkylation of benzene (the preferred aromatic hydrocarbon) with the halogenated n-paraffinic and isoparaffinic hydrocarbons containing from 10 to 15 carbon atoms. In some instances high aromatic content naphtha fractions boiling within the range of from about 175 to about 300° F., such as can be obtained from thermally cracked naphthas, can be employed as a source of alkylatable aromatic hydrocarbon. A particularly desirable catalyst is the complex of hydrocarbon with aluminum chloride. In addition to the catalyst it is desirable that the corresponding hydrogen halide be present in the reaction zone since this material maintains catalyst activity at a high level. The reaction rate and the conversion of the hydrocarbon feed is dependent on the amount of aluminum chloride in the aluminum chloride-hydrocarbon complex. However, the quantity of aluminum chloride in the complex can be varied over wide ranges to provide a corresponding range of feed reactant conversion. While the over-all activity of the catalyst is established by the aluminum chloride content, as stated, the presence of hydrogen chloride is required to provide a high activity. Usually the quantity of hydrogen chloride present is between about 0.5 and about 6 weight percent of the feed with about 2 to 4 weight percent being preferred. It is usually not necessary to add additional hydrogen chloride because the hydrocarbon charge will contain HCl liberated in the previous chlorination step. Also, HCl is liberated in the alkylation reaction.

The aluminum chloride-hydrocarbon complex catalyst can be originally prepared by mixing aluminum chloride and kerosene in a weight ratio of about 8:5. During operation of the process, the original complex catalyst is replaced with complex catalyst formed in the process. During operation of the process the heat of hydrolysis of the catalyst phase is usually in the range of 140 to 160 calories per gram. However, catalysts having higher heats of hydrolysis in the order of 300 to 325 calories per gram, e.g., new catalysts, can also be employed in the practice of the invention. It is also within the scope of the invention to employ catalysts having heats of hydrolysis less than 140 calories per gram, e.g., 100 to 139 calories per gram, as explained hereinafter. Thus, the over-all range of catalysts which can be employed in the practice of the invention are those having a heat of hydrolysis within the range of from 100 to 325 calories per gram.

The conditions employed in alkylation zone 14, will depend upon the catalyst employed, the aromatic hydrocarbon to be alkylated, and the boiling points of the haloalkanes. As will be understood by those skilled in the art, said conditions are interrelated. When employing the above-described aluminum chloride catalysts, the alkylation will generally be carried out at a temperature within the range of from 50 to 110° F. with a pressure sufficient to maintain liquid phase conditions and to prevent vaporization of catalyst. When operating in a continuous system, flow rates of reactants should be maintained such that the residence or contact time in the contactor or reaction zone is within the range of from about 10 minutes to about 30 minutes, preferably from about 10 to about 20 minutes.

The ratio of the total reactants fed to the reactor or alkylation zone, i.e., the sum of the aromatic hydrocarbon plus the mixture of haloalkanes, to the aluminum chloride catalyst will usually be within the range of from about 1:5 to 2:1, preferably about 1:1, on a volume basis. The mol ratio of the aromatic hydrocarbon to the haloalkanes entering the alkylation zone should be such as to furnish at least one mol of aromatic hydrocarbon, e.g. benzene, per gram atom of halogen on the haloalkanes. It is preferred to operate with an excess of aromatic hydrocarbon. Thus, the mol ratio of the aromatic hydrocarbon to the haloalkanes can vary over a wide range but will generally be maintained within the range of from about 2:1 to 30:1, preferably from 8:1 to 15:1.

It will be understood that alkylation zone 14 includes, in addition to a suitable contactor or reactor for carrying out the alkylation reaction, a separation vessel or zone wherein a hydrocarbon phase is separated from the catalyst phase which is returned to said contactor or reactor. Said hydrocarbon phase is withdrawn from zone 14 via conduit 21 and passed via conduit 22 into the lower portion of coalescer 23 for removal of entrained aluminum chloride catalyst. Said coalescer 23 can comprise any suitable type of vessel and conveniently comprises an upright tower containing a bed of any suitable contacting material such as porcelain saddles, Raschig rings, gravel, anthracite coal, etc. Coalesced and separated catalyst is withdrawn from the bottom of vessel 23 via conduit 24. Hydrocarbon phase, now substantially free of entrained catalyst but still containing dissolved aluminum chloride catalyst is withdrawn from said coalescer via conduit 26. In some instances where the amount of entrained catalyst in the hydrocarbon stream in conduit 21 is negligibly small, said hydrocarbon stream can be passed around said coalescer via conduit 28 and introduced into said conduit 27.

The hydrocarbon stream in conduit 27 is then introduced into fractionation zone 29. Said fractionation zone 29 can comprise any suitable number of conventional strippers and/or fractionators for making the indicated desired separations. An overhead fraction comprised principally of hydrogen chloride gas is withdrawn from said zone 29 via conduit 31. Said hydrogen chloride gas, with or without additional drying and/or other purification as may be necessary, can be passed to compression as a product of the process. If necessary or desirable a portion or all of said hydrogen chloride stream in conduit 31 can be returned to the conversion zone, in those conversion processes wherein hydrogen chloride is not produced, as the hydrogen chloride promoter for the aluminum chloride catalyst utilized therein.

An overhead fraction comprising nonhalogenated hydrocarbons is withdrawn from said fractionation zone 29 via conduit 32 and passed into conduit 10 for recycle to said halogenation zone 11. Another overhead fraction comprising benzene is withdrawn from said fractionation zone 29 via conduit 33 and passed into conduit 17 for recycle to said alkylation zone 14. A bottoms or heavy alkylate stream withdrawn from said fractionation zone 29 via conduit 34 comprises a high molecular weight, high density material and can be utilized as a high density fuel stock.

A product alkylate stream is withdrawn from said fractionation zone 29 via conduit 36 and passed via conduit 37 into contacting zone 38 wherein it is contacted with a molecular sieve adsorbent having a pore diameter within the range of from 5 to 20 angstroms, which adsorbs at least the major portion of the primary haloalkanes contained in said alkylate, thereby producing an alkylate of increased purity. Said purified alkylate is withdrawn from contacting zone 38 via conduit 39 and passed via conduit 41 to storage, as a product of the process, for subsequent use in the manufacture of detergents or other use.

It will be understood that contacting zones 38 and 42, here shown to be adsorption and regeneration zones respectively, are employed in conventional on-stream-off-stream operations by means of the manifolding shown. Thus, when the molecular sieve adsorbent in contacting or adsorption zone 38 has become spent, i.e., it will no longer adsorb primary haloalkanes, the alkylate stream in conduit 36 is switched from conduit 37 into conduit 43 and passed into contacting zone 42 which now becomes the on-stream adsorption zone. Treated alkylate is withdrawn from said contacting zone 42 via conduits 44 and 46 for withdrawal from the system via conduit 41 as a product of the process as described above.

After the alkylate stream has been switched from contacting zone 38 to contacting zone 42, a stream of a suitable regeneration medium such as described above is passed via conduit 48 into conduit 49 for introduction into conduit 37 and then into said contacting zone 38. Said conduit 48 can contain a suitable heater (not shown) for heating said regeneration medium. Said regeneration medium contacts the used or spent adsorbent in contacting zone 38 and desorbs or removes the adsorbed haloalkanes therefrom. Desorbed haloalkanes, together with said regeneration medium, are removed from contacting zone 38 via conduit 39 and passed via conduits 51 and 52 into separation zone 47 where a separation between said regeneration medium and said haloalkanes is effected. The thus desorbed primary haloalkanes can be withdrawn from separation zone 47 via conduit 53 as a product of the process as previously described. Make-up regeneration medium can be added to the system when necessary via conduit 54. When said regeneration medium is a heated gas such as hydrogen, it will be understood that separation zone 47 includes the necessary and conventional condensing equipment for condensing the desorbed primary haloalkanes and then effecting a gas-liquid separation. When a liquid regeneration medium is employed, said separation zone can comprise suitable distillation and fractionation means or other suitable means for effecting a liquid-liquid separation. It will be understood by those skilled in the art that when the adsorbent in contacting zone 42 becomes spent, the alkylate stream in conduit 36 is switched back to conduit 37 and said contacting zone 42 is then regenerated in the same manner as previously described for said contact zone 38.

The following example will serve to further illustrate the invention.

Example

A sample of a product alkylate produced in accordance with the process illustrated in the drawing and comprising a mixture containing about 3.1 weight percent normal $C_{13}$ to $C_{15}$ paraffin hydrocarbons, about 96.1 weight percent of monoalkyl benzenes wherein the alkyl substituent contained from 10 to 13 carbon atoms, about 0.3 weight percent of 1-chlorododecane, and about 0.5 weight percent of 1-chlorotridecane was vigorously shaken for 15 minutes at ambient temperature (80° F.) and pressure with one-third of its volume of a Linde Type 5A molecular sieve material. Said Linde Type 5A molecular sieve material is a commercially available calcium alumino-silicate having the water of hydration removed and having a pore size of about 5 Angstroms. After said contacting the sieve material was separated from the alkylate and drained, and said alkylate was again analyzed. It was found that the concentration of the 1-chlorododecane had been reduced to 0.1 weight percent (67 percent removal), and the concentration of the 1-chlorotridecane had been reduced to 0.2 weight percent (60 percent removal). There were only small relatively insignificant changes in the concentration of said other components in said alkylate product after said treatment.

It can be seen from the results of the above example that a molecular sieve material having a pore diameter of 5 Angstroms will selectively adsorb primary chloroalkanes from mixtures thereof with other hydrocarbons. It was particularly surprising that the molecular sieve would selectively remove the primary haloalkanes in the presence of the normal paraffins and the alkylated benzenes.

While the invention has been described with particular reference to the removal of chloroalkanes from alkylate products, said invention can be employed to remove chloroalkanes from other hydrocarbon fractions. It is also within the scope of the invention to remove other haloalkanes, e.g., iodoalkanes and bromoalkanes from alkylates and other hydrocarbon fractions.

While certain embodiments of the invention have been described for illustrative purposes, the invention obviously is not limited thereto. Various other modifications will be apparent to those skilled in the art in view of this disclosure. Such modifications are within the spirit and scope of the invention.

We claim:

1. A process for the production of an improved detergent grade alkylate and the production of a high purity chloroalkane, which process comprises, in combination, the steps of: chlorinating paraffinic hydrocarbons containing from 10 to 15 carbon atoms per molecule with chlorine in a chlorination zone under chlorination conditions to produce a mixture of chlorinated and nonchlorinated hydrocarbons; alkylating an aromatic compound selected from the group consisting of benzene, toluene, and xylene in an alkylation zone in the presence of an aluminum chloride catalyst under alkylation conditions to form an alkylate stream; fractionating said alkylate stream in a fractionation zone and recovering therefrom a product alkylate stream comprising nonchlorinated paraffinic hydrocarbons, alkylated aromatic compound, and unreacted primary chloroalkanes; passing said product alkylate stream into an adsorption zone and therein contacting same with a molecular sieve adsorbent material; in said adsorption zone, selectively adsorbing at least the major portion of said primary chloroalkanes into said molecular sieve material; withdrawing from said adsorption zone an improved product alkylate having a substantially reduced primary chloroalkane content; contacting said molecular sieve adsorbent material with a fluid regeneration medium to desorb said adsorbed primary chloroalkanes; and recovering said desorbed primary chloroalkanes as another product of said process.

2. A process for the production of an improved detergent grade alkylate and the production of high purity chloroalkanes, which process comprises, in combination, the steps of: chlorinating paraffinic hydrocarbons containing from 10 to 15 carbon atoms per molecule with chlorine in a chlorination zone under chlorination conditions to produce a mixture of chlorinated and nonchlorinated hydrocarbons; alkylating benzene with said mixture of hydrocarbons in an alkylation zone in the presence of an aluminum chloride catalyst under alkylation conditions to form an alkylate stream; fractionating said alkylate stream in a fractionation zone and recovering therefrom a product alkylate stream comprising nonchlorinated paraffinic hydrocarbons, alkylated benzene, and unreacted primary chloroalkanes; passing said product alkylate stream into an adsorption zone and therein contacting same with a molecular sieve adsorbent material having pore diameters of at least about 5 Angstroms; in said adsorption zone, selectively adsorbing at least the major portion of said primary chloroalkanes into said molecular sieve material; withdrawing from said adsorption zone an improved product alkylate having a substantially reduced primary chloroalkane content; continuing said contacting in said adsorption zone until said molecular sieze material is spent, and thereafter regenerating said molecular sieve material by contacting same with a fluid regeneration medium to desorb said adsorbed primary chloroalkanes; passing said desorbed primary chloroalkanes and said regeneration medium to a separation zone; in said separation zone, effecting a separation between said desorbed primary chloroalkanes and said regeneration medium; and withdrawing said desorbed primary chloroalkanes from said separation zone as another product of said process.

3. A process according to claim 2 wherein a substantially pure normal paraffinic hydrocarbon having from 10 to 15 carbon atoms per molecule is chlorinated in said chlorination step.

4. A process according to claim 2 wherein the catalyst phase in said alkylation zone has a heat of hydrolysis of less than 140 calories per gram.

5. A process for the production of an improved detergent grade alkylate and the production of high purity chloroalkanes, which process comprises, in combination, the steps of: alkylating benzene with a mixture of chlorinated and nonchlorinated paraffinic hydrocarbons containing from 10 to 15 carbon atoms per molecule in an alkylation zone in the presence of an aluminum chloride catalyst under alkylation conditions to form an alkylate stream; fractionating said alkylate stream in a fractionation zone and recovering therefrom a product alkylate stream comprising nonhalogenated paraffinic hydrocarbons, alkylated benzene, and unreacted primary chloroalkanes; passing said product alkylate stream into an adsorption zone and therein contacting same at a temperature within the range of from about 70 to about 200° F., a pressure within the range of from atmospheric to about 600 p.s.i.g. with a molecular sieve adsorbent material having rigid three-dimensional anionic networks and having pore diameters of at least about 5 Angstroms at a liquid space velocity within the range of from 0.5 to 5.0 volumes of alkylate per volume of adsorbent per hour; in said adsorption zone, selectively adsorbing at least the major portion of said primary chloroalkanes into said molecular sieve material; withdrawing from said adsorption zone an improved product alkylate having a substantially reduced chloroalkane content; continuing said contacting in said adsorption zone until said molecular sieve material is spent; and thereafter regenerating said molecular sieve material by contacting same with a fluid regeneration medium to desorb said adsorbed primary chloroalkanes; passing said desorbed primary chloroalkanes and said regeneration medium to a separation zone; in said separation zone, effecting a separation between said desorbed primary chloroalkanes and said regeneration medium; and withdrawing said desorbed primary chloroalkanes from said separation zone as another product of said process.

References Cited
UNITED STATES PATENTS

| | | | |
|---|---|---|---|
| 2,743,304 | 4/1956 | Sharrah | 260—671 |
| 3,045,055 | 7/1962 | Pool et al. | 260—683.48 |

OTHER REFERENCES

Barrer, "Separation of Mixtures Using Zeolites as Molecular Sieves," Journal of the Society of Chemical Industry, London, vol. 64, pp. 130–135, May 1945.

DELBERT E. GANTZ, *Primary Examiner.*

C. E. SPRESSER, *Assistant Examiner.*